United States Patent
Wooden et al.

(10) Patent No.: US 6,445,576 B1
(45) Date of Patent: Sep. 3, 2002

(54) TILT MOUNTED HARD DRIVE BAY

(75) Inventors: Brad R. Wooden, Aloha, OR (US); Lane C. Cobb, Ridgefield, WI (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/513,539

(22) Filed: Feb. 25, 2000

(51) Int. Cl.$^7$ ................ H05K 7/16; G06F 1/16
(52) U.S. Cl. ............. 361/683; 361/685; 361/725; 361/726; 361/727; 312/223.1; 312/223.2; 364/708.1; D14/100-117
(58) Field of Search ................ 361/683, 685, 361/725, 726, 727; 312/223.1, 223.2; D14/100-117; 364/708.1

(56) References Cited

U.S. PATENT DOCUMENTS

| D310,355 S | * | 9/1990 | Trager ................. D14/109 |
| 5,112,119 A | * | 5/1992 | Cooke et al. ............ 312/283 |
| 5,236,259 A | * | 8/1993 | Ryan et al. ............. 312/244 |
| 5,572,402 A | * | 11/1996 | Jeong ................. 361/685 |
| 5,680,293 A | * | 10/1997 | McAnally et al. ........ 361/685 |
| 5,808,864 A | * | 9/1998 | Jung .................. 361/685 |
| 5,995,364 A | * | 11/1999 | McAnally et al. ........ 361/685 |

* cited by examiner

*Primary Examiner*—Darren Schuberg
*Assistant Examiner*—David Foster
(74) *Attorney, Agent, or Firm*—Fish & Richardson P.C.

(57) ABSTRACT

A hinged disk drive bay for a server. The bay is hinged such that it moves between a stowed position in which the bay is vertical, and a tilted position in which the bay is open. When open, the connections are exposed to the user.

15 Claims, 4 Drawing Sheets

TILT MOUNTED HARD DRIVE BAY

BACKGROUND

Computers often operate using connections between a main processing board, e.g. a motherboard, and auxiliary equipment. The auxiliary equipment can include a disk drive, such as a "hard drive".

Such devices have often been mounted in a bay within a computer. However, removing the hard drive often requires that the end user access the inside of the computer by removing the outer cover. Once inside, it not always intuitive how to remove the hard drive.

BRIEF DESCRIPTION OF THE DRAWINGS

These and other aspects will be described in detail with reference to the drawings, in which.

DETAILED DESCRIPTION

The present application teaches a system of mounting a removable drive rack. This system can hold removable drives in a special and new way within a computer system. The computer system can be a headless server or any other kind of computer system.

Figure 1:
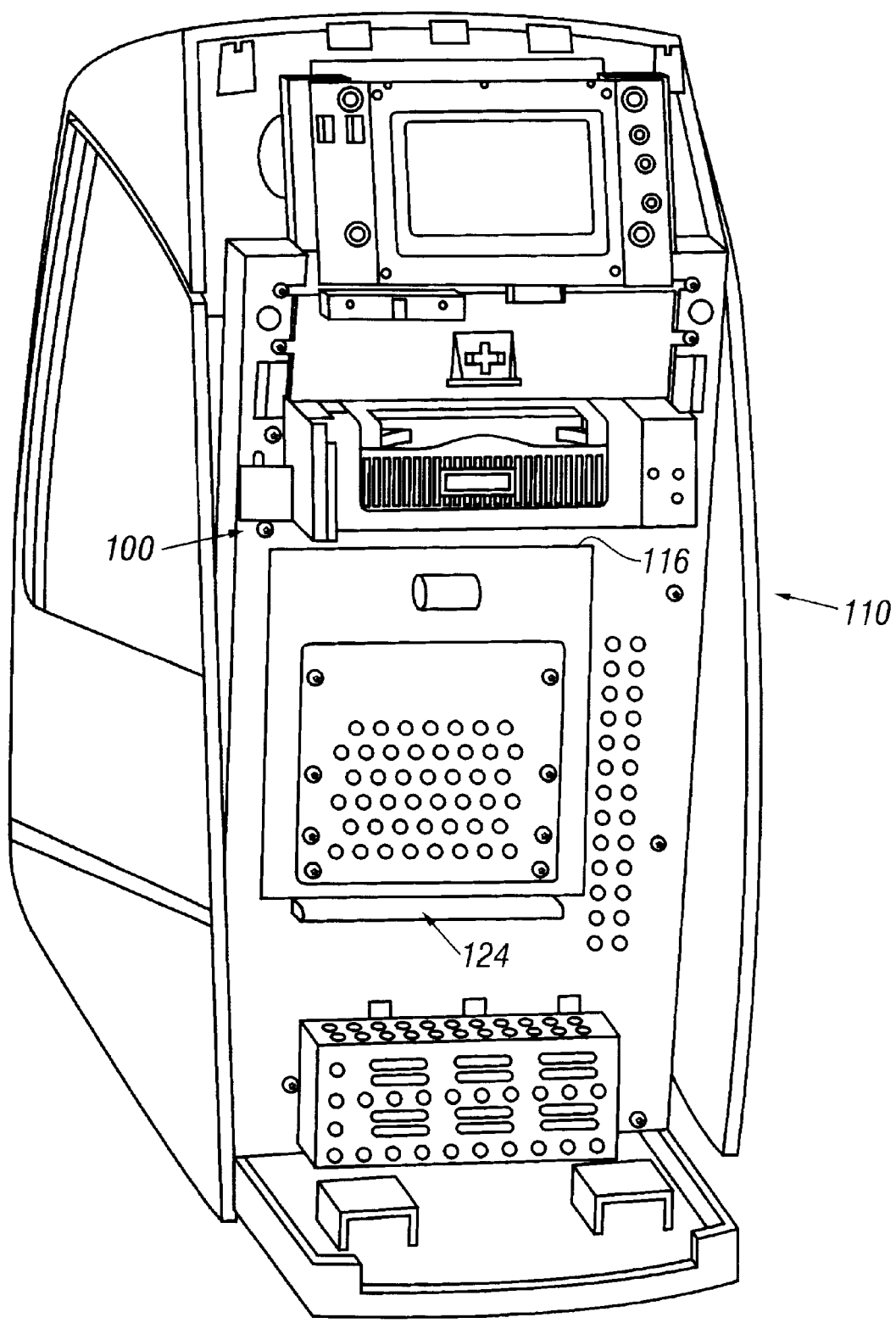
FIG. 1 shows a front view of the computer system.

FIG. 1 shows the front of the chassis 100. The chassis includes conventional structure to house computer parts. The chassis has a front, rear, and other parts, as well as computer holding parts. The special tilt mounted drive bay of the present application is located in the front of the chassis where it can be most easily accessed by a user. The bay is arranged with a hinge element 124 that enables the top portion 116 of the drive bay to tilt forward, away from the front of the chassis 100, and to face toward the user.

Figure 2:
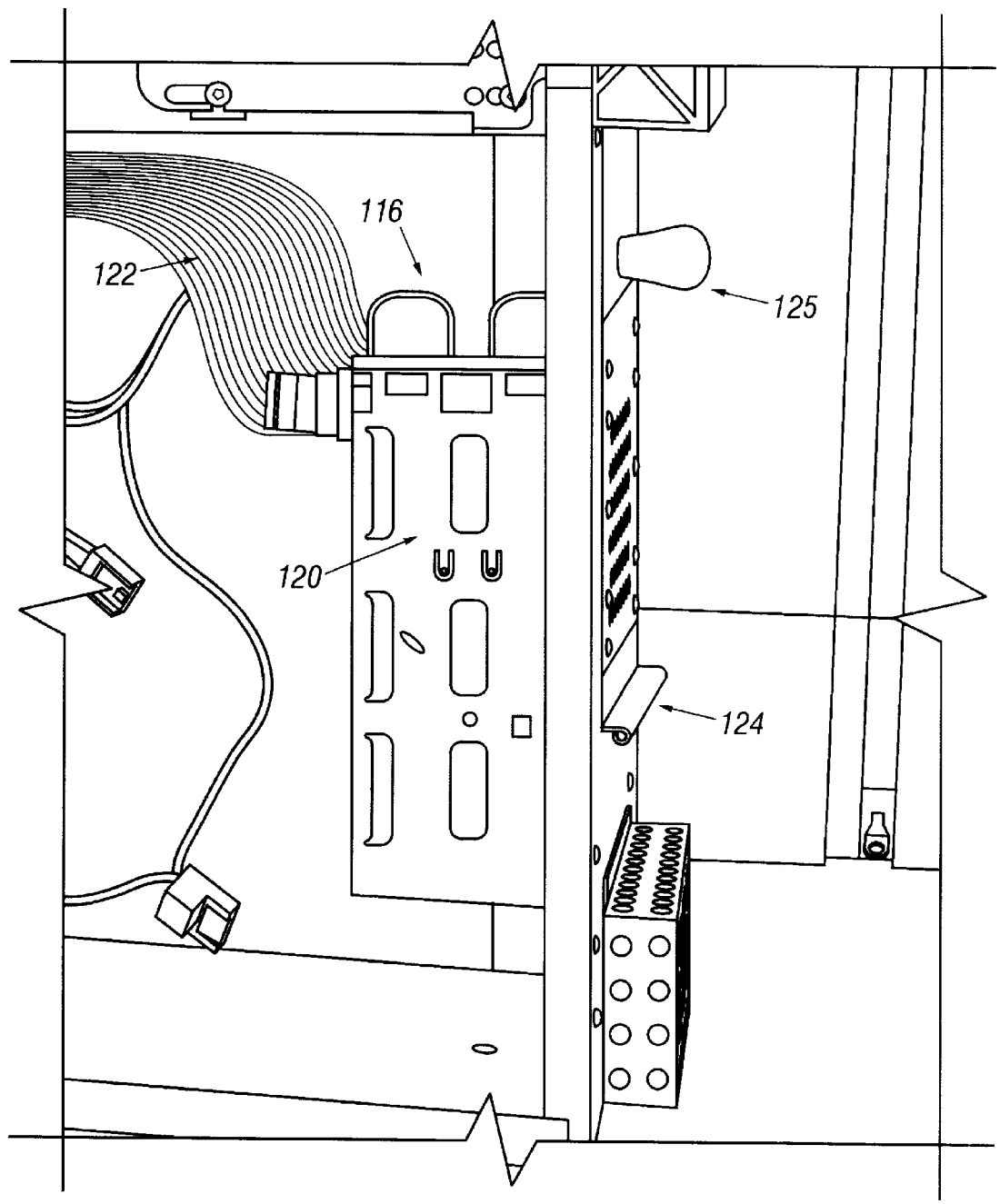
FIG. 2 shows a side view of the computer system, showing the drive rack in its stowed position.

FIG. 2 shows the chassis 100 as viewed from the side. The chassis has inside surfaces defining at least one disk drive mounting surface, against which the disk drive is pressed to hold the disk drive in place. The drive bay 120 can be mounted vertically when in its stowed position, such that the platter of the hard drive or drives that are within the drive bay will spin in the vertical direction, substantially in parallel to an axis of the chassis. Alternately the drive can rotate in any desired way. The top of the drive bay will swing out toward the user, hinged on hinge element 124. A handle 125 allows the door to be pulled into the hinged position.

The drives within the bay 120 are connected, via connection cable 122, to the computer, e.g., the drive controller element on the motherboard. The front of the drives are arranged near hinge element 124.

Figure 3:
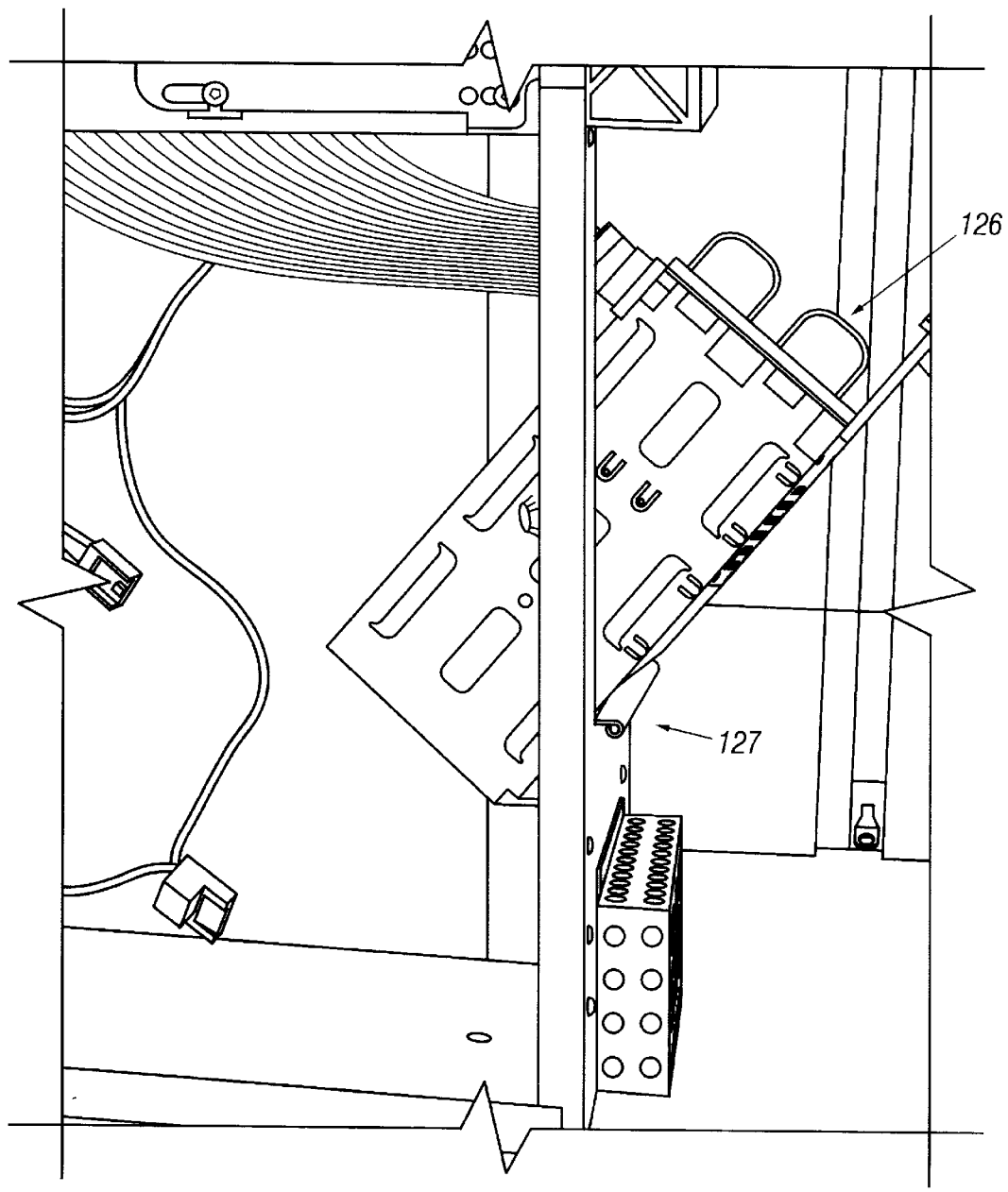
FIGS. 3 and 4 show the drive rack being tilted out.

The drive bay is moved between its open and closed position by applying force using the handle 125, to hinge the unit on this hinge element 124. FIG. 3 shows the hard drive being moved to its hinged-out position. A stop surface 127 presses against the chassis to limit the amount of motion of the disk drive. The top of the drive bays is tilted outward by this operation.

The disk drives are inserted into the bays with their front portion facing down, and their rear portions facing up. The rear portion includes the connection area, which connects to the data cable 122 from the computer and the power connector.

FIG. 3 shows how the top portion 126 of the drive bay 120 can be swung outward towards the user. This top portion exposes the rear of the disk drive, which is where the connections are made. Hence, when opened in this way, the user gets access to the cabling 122, which is swung out, away from the chassis and toward the user.

Figure 4:
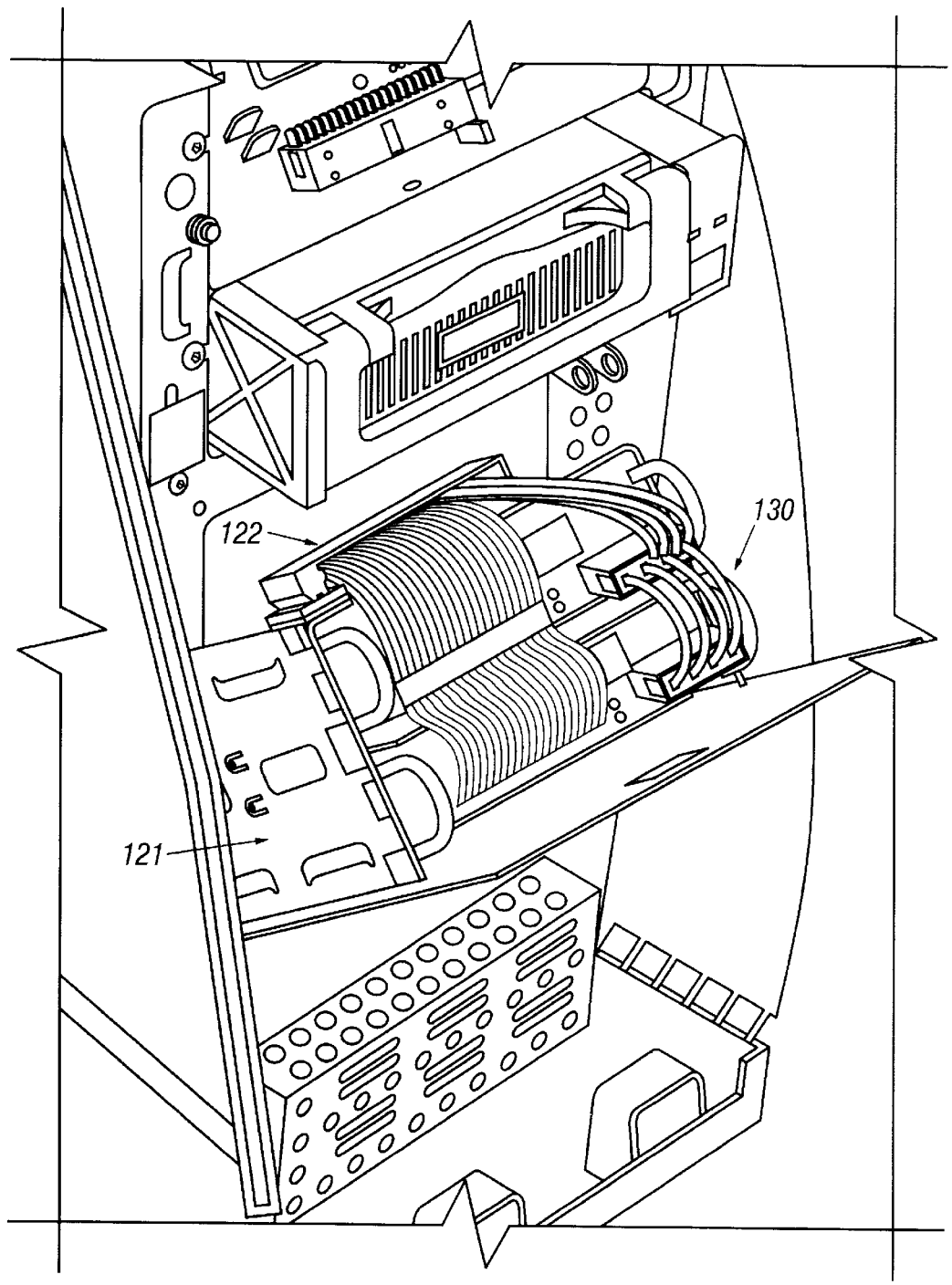

FIG. 4 shows the view seen by the user when the hard drive bay is swung out in this way. The user gets access to the rear portion 126 of one or more hard drives. FIG. 4 shows how two hard drives can be mounted in adjacent bays, where the two drives are constrained relative to one another. The user has access to power connections 130 as well as to data connections 122. This allows the user to easily remove connections, remove a drive, insert a new drive, reconnect the new drive, and begin operation using the new drive.

Again, a first and second hard drive can both be encased within the same tiltable housing 121 using this technique.

The disk drive connections 122, 130 can be removed, and the disk drive can then be physically removed from the bays. The drives can be serviced or replaced with another drive. This system is much easier to open, and the cabling is simplified, since the connection does not move as far, and hence the cables need not be as long as in the prior art. This facilitates making the devices, and also facilitates removing and swapping the drives. This can be especially important in a headless server that has no user interface, since it allows relatively easy update to such a system.

Although only a few embodiments have been disclosed in detail above, other modifications are contemplated. For instance, while only two disk drives are disclosed to be within the drive bay, any number of disk drives, e.g., from 1 to 8 of such drives, can be used. All such modifications are intended to be encompassed within the following claims, in which:

What is claimed is:

1. An assembly, comprising:
   a chassis, having structure to house computer parts, and having a front plate;
   a drive bay element, having a hinged part connected to said front plate, and an opposite end that is moved by hinging on said hinged part, said drive bay having inside surfaces defining at least one disk drive mounting surface, and such that said opposite end is moved by said hinging between a stowed position in which said drive bay is substantially parallel to said chassis, and an open position in which said opposite end is tilted to project out of said chassis.

2. An assembly as in claim 1, further comprising at least one disk drive, having a front portion, and a rear portion with electrical connections thereon, said disk drive being loaded into said drive bay element with said front portion being completely within said drive bay element, and said rear portion at said opposite end.

3. An assembly as in claim 2, further comprising a connection to said at least one disk drive, and said opposite end.

4. An assembly as in claim 1, further comprising a handle part connected to a bottom portion of said drive bay.

5. An assembly as in claim 1, wherein said drive bay includes a stop surface thereon, which prevents further motion of said drive bay beyond a specified tilting point.

6. An assembly as in claim 3, further comprising a computer motherboard, having a drive controller, connected to said at least one disk drive.

7. An assembly as in claim 1, wherein said drive bay includes locations for two disk drives, and further comprising a separation surface, inside said drive bay, operating to separate said two disk drives.

8. An assembly as in claim 6, wherein said chassis houses a headless server.

9. A method of obtaining access to a disk drive, comprising:

mounting said disk drive in a stowed position in which the drive is parallel to an axis of a chassis;

hinging said drive to tilt a connected side of said disk drive to a location outside said chassis.

10. A method as in claim 9, wherein said mounting comprises mounting said disk drive into a holder that stores a front of said disk drive at a bottom of said holder.

11. A method as in claim 9, further comprising, while said drive is tilted, disconnecting said disk drive, removing said disk drive, inserting a disk drive, and connecting the inserted disk drive.

12. A computer, comprising:

a chassis;

a motherboard, coupled to said chassis;

a drive bay, coupled to said chassis, and including at least one disk drive, coupled to said motherboard, said drive bay having a first position which is stowed, and in which a platter of said disk drive spins in a horizontal direction, and a tilted position in which a connection part of said disk drive faces away from said chassis, at a tilted orientation relative to vertical, and in which connection parts of said disk drive face away from said chassis.

13. A computer as in claim 12, wherein said drive bay holds two disk drives.

14. A computer as in claim 12, further comprising a handle on a front of said drive bay, enabling said tilting of said drive bay.

15. A computer as in claim 12, wherein said computer is a headless server, that has no user interface.

* * * * *